United States Patent

[11] 3,579,249

[72] Inventors Raymond D. Dewey
Bon Air;
Robert S. Mapes; Garth S. Jones,
Richmond, Va.
[21] Appl. No. 848,474
[22] Filed Aug. 8, 1969
[45] Patented May 18, 1971
[73] Assignee Reynolds Metals Company
Richmond, Va.
Continuation-in-part of application Ser. No. 767,614, Oct. 15, 1968.

[54] FEATURE COUNTER HAVING BETWEEN LIMITS AMPLITUDE AND/OR WIDTH DISCRIMINATION
16 Claims, 13 Drawing Figs.

[52] U.S. Cl. .......... 178/6, 178/6.8, 235/92, 356/102
[51] Int. Cl. .......... G01n 15/02, H04n 7/18
[50] Field of Search .......... 178/6 (IND), 6—8; 356/102; 235/92 (PC)

[56] References Cited

UNITED STATES PATENTS

| | | | |
|---|---|---|---|
| 2,674,915 | 4/1954 | Anderson | 178/6 |
| 2,803,406 | 8/1957 | Nuttall | 178/6 |
| 3,321,575 | 5/1967 | Lewczyk | 178/6 |
| 3,389,789 | 6/1968 | Watson | 178/6 |

*Primary Examiner*—Bernard Konick
*Assistant Examiner*—Howard W. Britton
*Attorney*—Glenn, Palmer, Lyne, Gibbs and Thompson

ABSTRACT: A specimen analyzer including a video camera for scanning a specimen and selectively counting features thereof on the basis of grey level and size. The device may operate in several modes to count only features darker (or lighter) than a selected grey level, to count only features that are darker than a first grey level but lighter than a second grey level, to count only features wider than a selected width, to count only features wider than a first width but not as wide as a second width, or to count features that meet more than one of these tests. A variable electronic mask permits the operator to select any area of the specimen within the view of the camera for feature analysis without moving the specimen. Check spot pulses are generated for each feature counted and these may be displayed on a video motor superimposed on a video display of the specimen.

INVENTORS
RAYMOND D. DEWEY
ROBERT S. MAPES &
GARTH S. JONES

BY Glenn, Palmer, Lyne
Gibbs and Thompson
ATTORNEYS

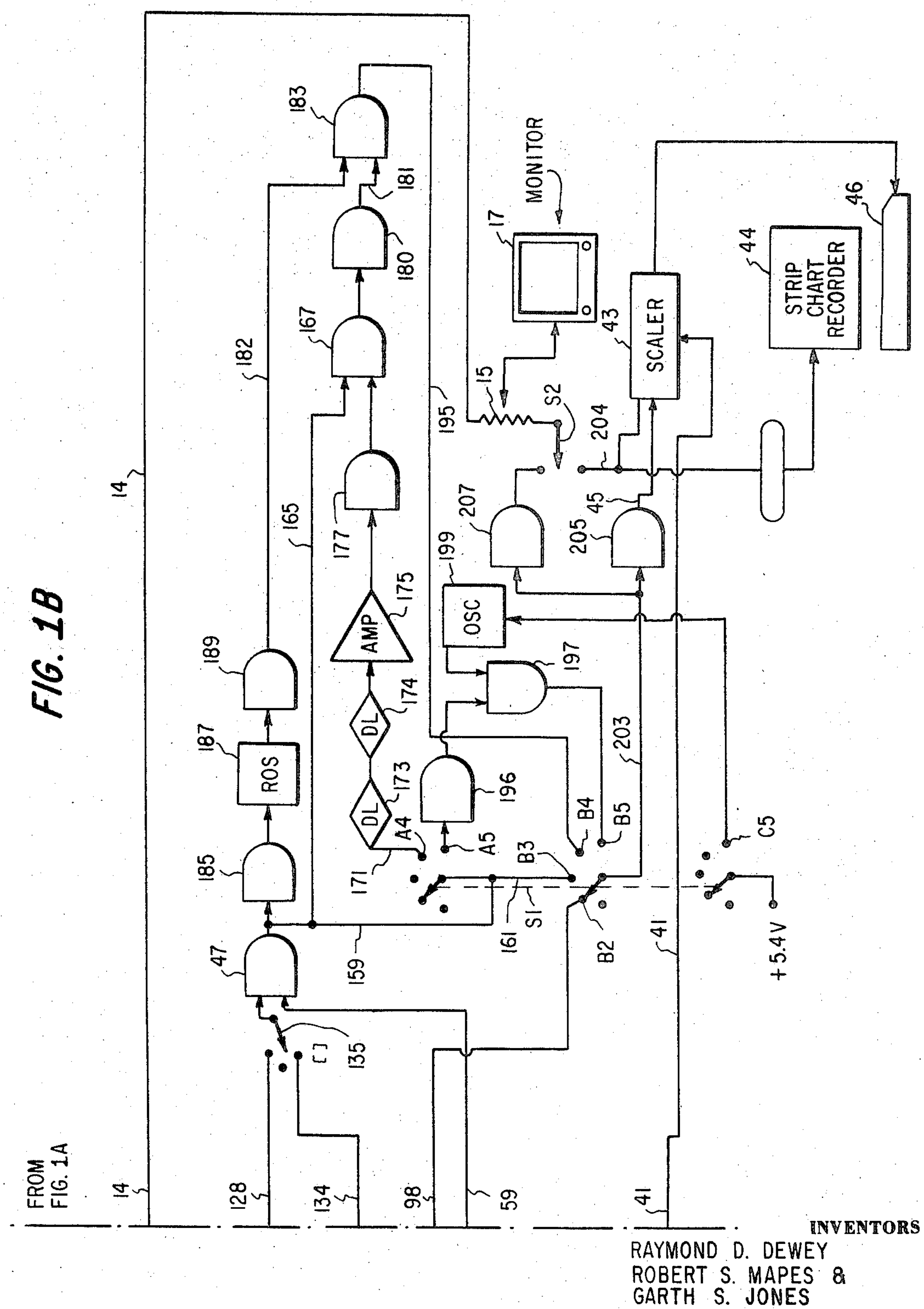
INVENTORS
RAYMOND D. DEWEY
ROBERT S. MAPES &
GARTH S. JONES
BY Glenn, Palmer, Lyne
Gibbs and Thompson
ATTORNEYS

INVENTORS
RAYMOND D. DEWEY
ROBERT S. MAPES &
GARTH S. JONES

BY Glenn, Palmer, Lyne
Gibbs and Thompson
ATTORNEYS

INVENTORS
RAYMOND D. DEWEY
ROBERT S. MAPES &
GARTH S. JONES

BY Glenn, Palmer, Lyne Gibbs and Thompson
ATTORNEYS

INVENTORS
RAYMOND D. DEWEY
ROBERT S. MAPES &
GARTH S. JONES

BY Glenn, Palmer, Lyne
Gibbs and Thompson
ATTORNEYS

FEATURE COUNTER HAVING BETWEEN LIMITS AMPLITUDE AND/OR WIDTH DISCRIMINATION

RELATED APPLICATION

This application is a continuation-in-part of our copending application Ser. No. 767,614 filed Oct. 15, 1968.

PRIOR ART

Many particle counters of the prior art employ flying spot scanners to scan the specimen to be analyzed. Some of these devices operate in accordance with light transmitted through the specimen and thus cannot be used to analyze surface features of an opaque specimen. Others operate in accordance with light reflected from the specimen but these devices have heretofore lacked the desired degree of resolution and accuracy.

Some of the particle counters of the prior art employ video cameras for scanning the specimen being analyzed thus permitting the analysis of the features of an opaque specimen. However, these devices suffer one or more disadvantages. Some are not capable of distinguishing the size of features; others are not capable of distinguishing between features of different colors or different shades of grey; others are inaccurate in that unusual shapes such as O or Y may be counted as more than one feature; still others are inaccurate in that they are incapable of distinguishing between closely spaced features and thus may count several closely spaced features as a single feature. While some prior art devices are capable of counting O- or Y-shaped features as a single feature, this ability is obtained by sacrificing the ability to distinguish between closely spaced features.

In specimen analysis it is desirable to be able to view the specimen being analyzed and to provide some indication on the display as to which features are being counted. However, these devices cannot accurately count O-shaped features and are not readily adapted for use with devices that can count such features.

A further disadvantage of the prior art has been the lack of a readily adjustable mask for selecting any desired area of the specimen for examination. Both the mechanical and electronic masks heretofore used in particle counters have required elaborate compensating circuits to prevent erroneous counts when the scanner passes from the unmasked to the masked area of the specimen.

SUMMARY OF THE INVENTION

An object of this invention is to provide a specimen analyzer which is capable of performing the functions of various prior art devices without the disadvantages of such devices.

It is an object of this invention to provide an accurate specimen analyzer which is capable of counting each O- and Y-shaped feature as a single feature.

Another object of this invention is to provide a specimen analyzer which counts features greater than a preselected width and darker (or lighter) than a preselected grey level.

A further object of this invention is to provide a specimen analyzer capable of accurately counting O- and Y-shaped features according to size or grey level, and including means for visually displaying a reproduction of the specimen being analyzed, and means for superimposing upon the display a check spot adjacent each feature counted.

A still further object of this invention is to provide a specimen analyzer including a video camera for scanning a specimen, digital logic circuit means for distinguishing scanned features in the specimen on the basis of size or grey level, a marking means, and means for counting the distinguished features only if they are located in an unmasked area. The mask operates only on digital logic signals rather than the video camera signals and thus requires no special compensating circuits for overcoming edge effects.

Another object of the invention is to provide a specimen analyzer including means for distinguishing features on the basis of grey level or width, or both grey level and width, and means for displaying an indication of the features thus distinguished. Features may be distinguished as to grey level on the basis of whether they are darker (or lighter) than a selected grey level, or on the basis of whether they are darker than a first level but lighter than a second level. The features may be distinguished as to width on the basis of whether they are wider than a selected width, or on the basis of whether they are wider than a first width but not as wide as a second width.

It is also an object of this invention to provide a specimen analyzer for counting features according to size and employing a retriggerable one-shot multivibrator as a pulse width discriminator whereby two features will be separately counted even if they are closely spaced.

It is also an object of this invention to provide means for determining the area of features within an unmasked area on the basis of grey level or width, said means employing an oscillator circuit which is turned on and off by digital signals representing the features, the area of the features being directly proportional to the number of oscillator pulses.

A further feature of the invention is the provision of means for compensating for variations in the background whereby said background does not inadvertently cause the analyzer to count the background variations as features.

These and other objects of the invention are accomplished by the provision of a video camera, a scaler, a video monitor, an electronic mask, an oscillator, and a digital logic circuit including a grey level discriminator, a pulse width discriminator, a delay line and a coincidence circuit. As the video camera scans across the specimen under analysis it provides an output voltage which varies in accordance with the grey level of the scanned portion of the specimen. This signal is fed to the grey level discriminator which produces a binary-type output pulse. This pulse lasts as long as the camera scans a feature which satisfies the selected range of grey level. The output of the grey level discriminator is applied to the pulse width discriminator which produces an output signal only if the output pulse from the grey level discriminator has a duration which corresponds to the selected particle size.

Sync signals from the video camera are applied to four one-shot multivibrators which comprise a manually adjustable electronic mask. The outputs from the one-shot multivibrators are logically combined and then used to control the output from the pulse width discriminator so that pulses from the discriminator are blocked if they were developed as a result of scanning a feature outside of the unmasked area.

The pulses from the discriminator that are not masked out are applied to a feature discriminator including a coincidence circuit and a delay line having a delay equal to one line scan interval of the video camera. The coincidence circuit compares the output from the pulse width discriminator with the output of the delay line and produces an output signal one line scan interval after the video camera last scans the feature. This output signal is applied to a scaler to provide a count of the number of features falling within the selected grey level range, and falling within the selected range of feature size. It may also be applied to the video monitor or display.

Switch means are provided for selectively applying to the scaler and/or video monitor the output signals from the video camera, the feature discriminator, the grey level discriminator, and the pulse width discriminator.

The output of the oscillator is gated by the combined output of the pulse width discriminator and the masking circuit to provide an input to the scaler indicative of the area of features falling within both the preselected grey level and the preselected width, said features being located within the unmasked area of the specimen.

BRIEF DESCRIPTION OF THE DRAWINGS

FIGS. 1A and 1B, when arranged as shown in FIG. 1C, form a schematic block diagram of a specimen analyzer in accordance with the invention;

DETAILED DESCRIPTION

In the following description of the operation and construction of the invention reference will be made to signals as being positive or negative. It should be understood that this reference is only for the purpose of simplifying the description. In a preferred embodiment the basic logic block is a transistorized NAND gate which produces a logical one (5.4 v.) output signal if any input is at the logical 0 level (0 v.). If all inputs are either open or at the logical one (high) level then the output is at the logical zero (low) level. The term positive refers to the logical one level and the term negative refers to the logical zero level. The terms as used in describing logical operations are used in the sense that they are relative to each other.

A NAND circuit having a single information input is referred to herein as an inverter. The unused inputs may either be left open or connected to a logic one voltage level.

Video Scanning and Display.

Figures 1A, 1C:
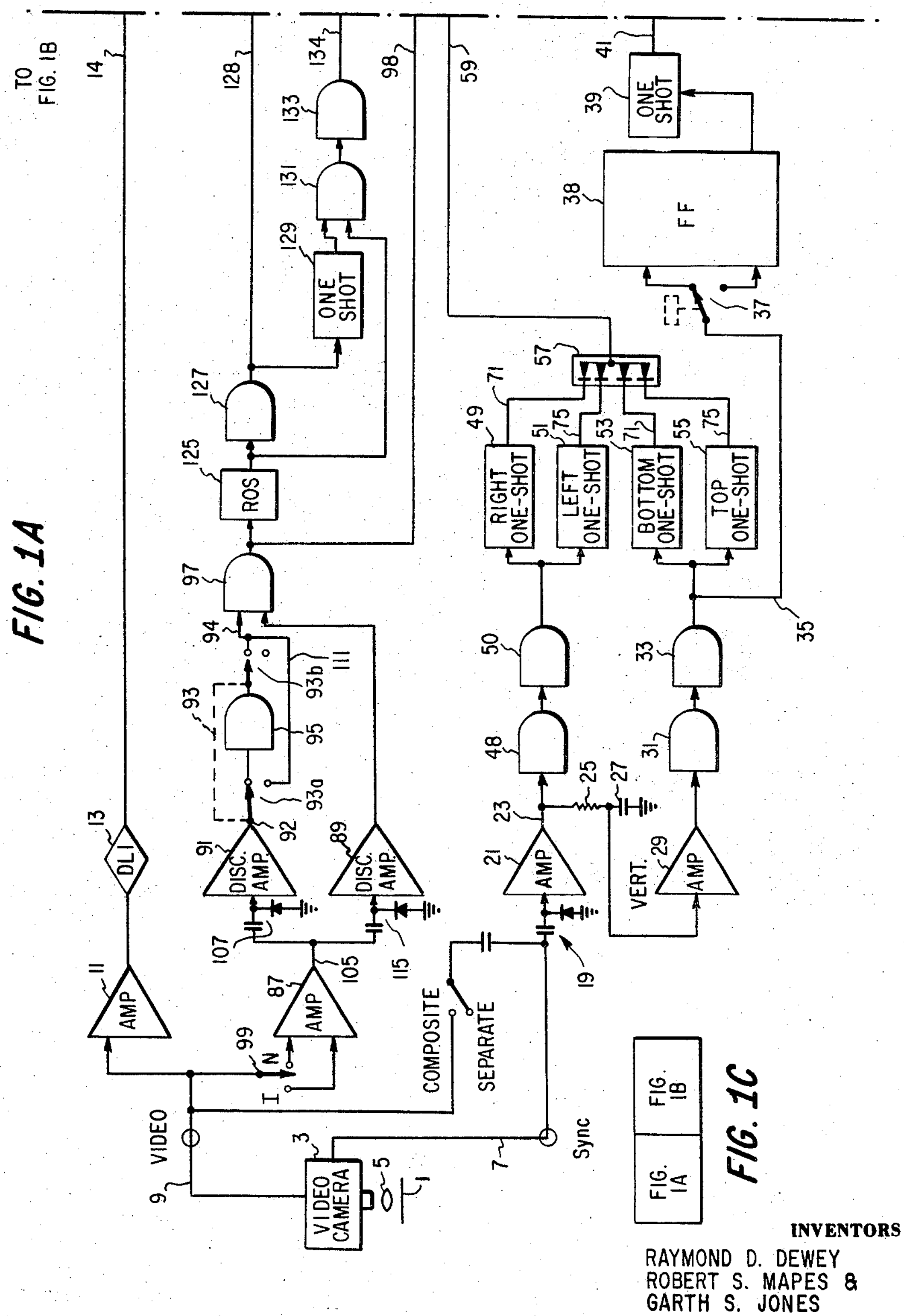

Referring now to FIGS. 1A and 1B, a specimen 1 is scanned by video camera 3 through a microscope or other lens system 5. This specimen may be a metallic object a blood sample, a sample of pollutants taken from the air, or any other specimen having features or particles which it is desired to count.

The video camera 3 may be a conventional television camera such as is commonly used in closed circuit television systems and preferably has a resolution of 800 lines per frame. For purposes of the present description, the camera is shown as being adapted to produce vertical and horizontal sync pulses on an output lead 7, and a video signal on an output line 9. The video signal on line 9 is applied through a buffer amplifier 11, a trimmer delay 13, and a potentiometer 15 to the input of a conventional television-type display monitor 17. The monitor may continuously display an image of the specimen within the field of view of the video camera 3 provided the video signal is not attenuated by the setting of potentiometer 15.

Cycle Control.

A primary purpose of the present invention is to count the number of features in the specimen 1 which meet certain criteria as to grey level and size. Since the video camera continuously scans the specimen it is obvious that the features in the specimen are scanned many times in a very short interval. Therefore, some cycle control means must be provided to limit the counting operation to one (or more) field of the video camera scanning cycle.

To accomplish this the negative horizontal and vertical sync pulses from the video camera are applied over lead 7 and a diode-capacitor clamp 19 to an amplifier 21. A switch 10 is provided between lead 9 and clamp 19 so that the analyzer may be used with video cameras of the type that produce composite video and sync signals at a single output. The amplifier 21 is a noninverting amplifier which shapes the pulses before passing them to a lead 23.

The horizontal and vertical sync pulses at the output of amplifier 21 are applied over lead 23 to a resistance-capacitance filter comprised of a resistor 25 and a capacitor 27. The filter filters out the horizontal sync pulses and applies only the vertical sync pulses to an amplifier 29. This amplifier is a noninverting amplifier and, like amplifier 21, may be of the general type shown in FIG. 4. The output of amplifier 29 is applied to an inverter 31 which functions to adjust the amplifier output voltage to the logic levels used in the system. The output of inverter 31 is applied to an inverter 33 which brings the signal back into the proper phase. The output of inverter 33 is connected by way of a lead 35 to the common terminal of a pushbutton start switch 37. The start switch has a normally closed terminal connected to the reset input of a flip-flop 38 and a normally open contact connected to the set input of the flip-flop. The output of the flip-flop is connected to a one-shot multivibrator 39 and the output from this one-shot is connected by way of a lead 41 to the reset circuits and the count control circuits in the scaler 43.

As long as the push button switch 37 is in the position shown in FIG. 1A, vertical sync pulses are applied through the switch to the reset input of the flip-flop. However, these pulses have no effect on the flip-flop since it takes a negative pulse into the set input terminal to set the flip-flop once it has been reset. In order to initiate a feature count, the pushbutton switch 37 is operated thus closing the circuit to the set input terminal of the flip-flop. The first vertical sync pulse occuring after the push button is closed, sets the flip-flop thus causing a positive output signal to the one-shot 39. The transition of the voltage at its input from the negative to the positive level triggers the one-shot and it produces an output signal on lead 41. The timing constants of the one-shot multivibrator circuit are chosen such that the one-shot triggers immediately upon receiving a positive going input signal and returns to its normal state after an interval of time corresponding approximately to the time it takes the camera to scan one field. The scaler 43 may, for example, be a Hewlett-Packard model 5230L, having visual indicator means. The output of the one-shot 39 controls the readout and the resetting of the scaler, and the gating of count pulses into the scaler. The count pulses are applied to the scaler over the lead 45 in a manner subsequently described. The scaler produces an output pulse in response to each pulse it counts. These output pulses may be recorded by a strip chart recorder 44. In addition, the count in the scaler may be fed to electronic data processing equipment 46.

The scaler counts for only one cycle regardless of the interval of time that the pushbutton 37 is depressed. The flip-flop is set by the first sync pulse and nothing can change the state of the flip-flop except the release of the pushbutton so that a negative sync pulse may be applied to the reset input. Therefore, the flip-flop remains set as long as the pushbutton 37 is closed and the signal applied to the one-shot remains at a positive level during this interval. However, as subsequently explained in connection with FIG. 2, the one-shot 39 only responds to the transition of an input signal from a negative to a positive level. Once the one-shot responds to this transition it takes a second transition to cause a second operation of the one-shot, and this transition may occur only by releasing the pushbutton and again depressing it to again actuate the flip-flop.

For purposes of explanation, it has been assumed that the one-shot 39 must be set to allow counting by the scaler during only one scanning field of the camera cycle. In actual practice a better statistical count may be obtained by adjusting the one-shot so that each time the one-shot is triggered, it enables the scaler to count over a cycle which comprises 10 consecutive fields of scan. The correct count may then be obtained by displacing the decimal point one place to the left in the value displayed by the scaler.

Mask Control.

In some instances it is desirable to be able to analyze and count features in only a selected area of the specimen falling within the field of view of the video camera, while ignoring those features which fall outside the selected area. The electronic mask control circuit enables the operator of the device to select any area of the specimen within the field of view of the camera without moving the specimen. As subsequently explained, the video camera signals are passed through a grey level test circuit and a sizing test circuit so as to produce a digital pulse each time the camera scans across a feature which meets both the grey level and size tests. These digital pulses are applied to one input of a NAND gate 47. The output of the mask control circuit is applied to a second input of NAND gate 47 to effectively block those digital pulses which result from the video camera scanning the features outside of the area of interest.

The mask control circuit comprises four one-shot multivibrators 49, 51, 53, and 55. The horizontal and vertical sync pulses appearing at the output of amplifier 21 are shaped and brought to logic circuit level by an inverter 48. They are then brought back into phase by an inverter 50, and applied to the one-shot multivibrators 49 and 51 which control the right and left edges of the mask. The vertical sync pulses occur between fields of scan of the video camera so their effect on the multivibrators 49 and 51 may be ignored.

The one-shots 53 and 55 receive only vertical sync pulses from the inverter 33 and control the top and the bottom of the mask. The output of each of the one-shots is connected through a diode to the lead 59. The diodes function as a logical AND gate 57 so that the lead 59 is positive only when all of the one-shots are producing a positive output signal. A negative signal on lead 59 masks out all detected features by preventing the pulses representing these features from passing through the NAND gate 47.

Figure 2:
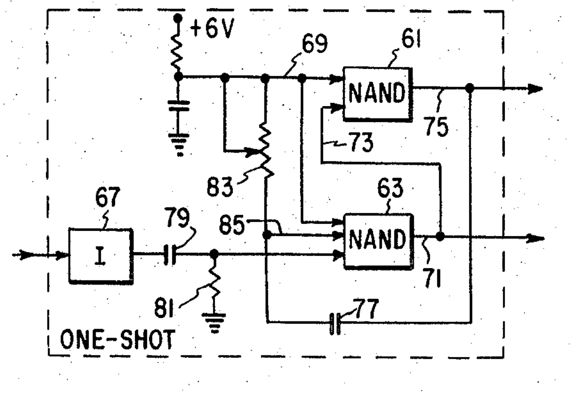
FIG. 2 is a schematic circuit diagram of a one-shot multivibrator.

FIG. 2 shows a one-shot multivibrator suitable for use in the mask control circuit. The one-shot comprises two logical NAND gates 61 and 63 and an inverter 67. A positive bias voltage is connected by way of a lead 69 to one input of both NAND gates. NAND gate 63 has an output 71 connected by way of a lead 73 to a second input of a NAND gate 61. NAND gate 61 has an output 75 connected through a timing capacitor 77 to a second input of NAND gate 63. The output of inverter 67 is applied through a differentiator comprised of a capacitor 79 and a resistor 81 to a third input of NAND gate 63. A potentiometer 83 is connected between lead 69 and the capacitor 77 to control the charging rate of the capacitor and thus the cycling time of the one-shot. The potentiometers 83 for each of the four one-shots in the mask circuit are mounted on the control panel of the specimen analyzer so that the operator may readily adjust the mask.

In the steady state condition of the one-shot multivibrator all inputs to NAND gate 63 are positive and it produces a negative output signal on the lead 71. This negative signal is applied to NAND gate 61 so that the multivibrator produces a positive output signal on lead 75. A positive going input pulse, such as that occuring at the end of a negative vertical or horizontal sync pulse, applied to the multivibrator is inverted by inverter 67 and the leading edge of the resulting negative signal is differentiated and applied to NAND gate 63. The NAND gate immediately produces a positive output signal on lead 71 and this is applied to NAND gate 61. Since the other input of NAND gate 61 is also positive, the output of the gate drops to the negative level. This discharges capacitor 77 so that the input 85 of NAND gate 63 drops to the negative level thus holding the output of this gate at the positive level.

After some predetermined interval of time, as determined by the setting of potentiometer 83, the capacitor 77 is recharged and the input 85 to NAND gate 63 rises to a positive level. With all inputs positive the NAND gate produces a negative output signal on lead 71. This signal is fed to NAND gate 61 so that the gate 61 produces a positive output signal. The multivibrator remains in this state until the next positive going signal is received as its input.

The one-shot 49 controls the position of the right edge of the mask because the output lead 71 of this one-shot is connected to the diode AND gate 57. One-shot 49 applies a positive pulse to the AND gate from a time immediately following the termination of a horizontal sync pulse until some time as determined by the setting of potentiometer 83 in the one-shot.

One-shot 51 is for the purpose of controlling the left edge of the mask. The output 75 of this one-shot is connected to the diode AND gate so the one-shot produces a negative output signal from a time immediately following a negative horizontal sync pulse until some period of time as determined by setting of its potentiometer 83. The output of the one-shot then becomes positive to condition one input of the AND gate.

One-shot 53 controls the bottom edge of the mask. The output 71 of this one-shot is connected to the AND gate so the one-shot applies a positive level signal to the AND gate from the time immediately following a negative vertical sync pulse until some interval of time as determined by the setting of the potentiometer 83. The output of the one-shot then goes negative to block the AND gate.

One-shot 55 is for the purpose of controlling the top edge of the mask so the output 75 of this one-shot is connected to the AND gate. This one-shot produces a negative output signal from time immediately following the termination of a negative vertical sync pulse until some interval of time as determined by the setting of the potentiometer 83 in the one-shot. Then, one-shot 55 produces a positive output signal to the AND gate.

The four one-shots provide an easily adjustable mask circuit that enables the operator of the analyzer to select for analysis any desired area of the specimen. Both the size and location of the area being analyzed are easily adjustable by means for four control knobs which control the potentiometers 83 in the one-shots. Furthermore, the mask has the advantage in that it does not mask all video signals produced by the camera but instead masks only the pulses representing features meeting both the grey level and width tests but falling outside of the desired area of analysis. Since the mask does not mask all video signals produced by the camera it is possible for the operator to view on the monitor 17 the whole specimen as seen by the camera while at the same time superimposing upon the display check spots which indicate the features within the unmasked area that meet both the grey level and width tests.

Grey Level Select.

The present invention includes means for discriminating between features on the basis of color or grey level, said means producing digital output pulses only for those features which are darker than a selected grey level, lighter than a selected grey level, or are a shade of grey darker than G=N but not darker than G=N−1, N being any selected grey level.

The grey level discriminating means comprises a buffer amplifier 87, discriminating amplifiers 89 and 91, a switch 93 having two sets of contacts 93*a* and 93*b*, an inverter 95, and a NAND gate 97.

Figure 3:
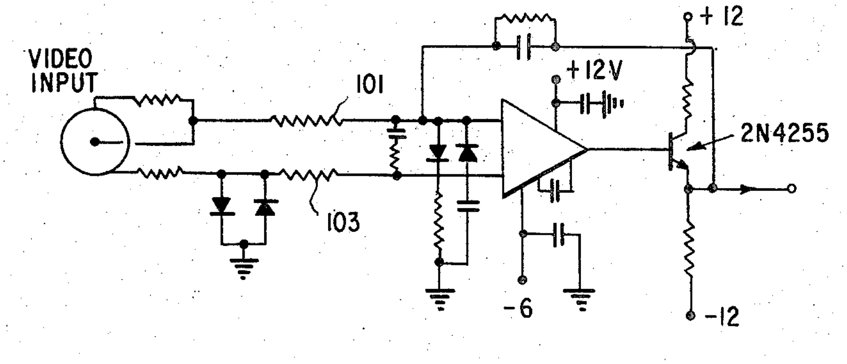
FIG. 3 is a schematic wiring diagram of a buffer amplifier.

The amplifier 87 may be a Fairchild Model 702IC of the type shown in FIG. 3, and has an inverting and a noninverting input. A switch 99, shown in FIG. 1A, is connected to the video output of camera 3 and is arranged to selectively apply the video signal to either the inverting or the noninverting input of the amplifier. The switch is not shown in FIG. 3 but may be located ahead of resistors 101 and 103 and arranged to reverse the connections between the video input and the resistors.

Amplifier 87, in conjunction with switch 99 permits the system to function with cameras producing either "black positive" or "white positive" video output signals. The system is designed for "white positive" operation so if the camera being used produces a "white positive" output, the switch 99 is set to apply the video signal to the noninverting input of amplifier 87. On the other hand, if the camera being used produces a "-black positive" output the switch 99 is set to apply the video signal to the inverting input of amplifier 87. In either case, the output of amplifier 87 appearing on lead 105 is "white positive."That is, the signal on lead 105 varies in magnitude in accordance with the color or the grey level of the portion of the specimen being scanned at any particular instant and becomes more positive as the portion being scanned becomes lighter.

The amplifier 87 also amplifies the video signal increasing the video envelope from 0.5 volts to about 2.0 volts. This provides for better selectivity in the grey level discrimination circuits next described.

Figure 4:
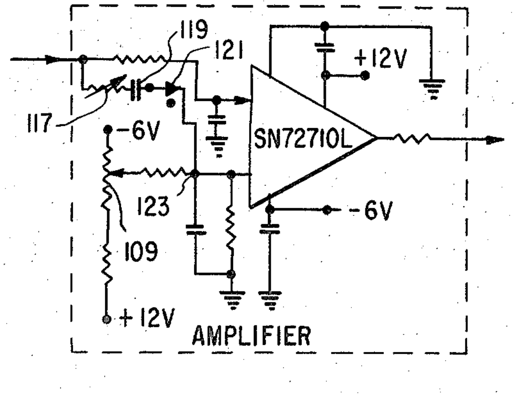
FIG. 4 is a schematic wiring diagram of a comparator amplifier.

The output lead 105 is connected through a diode-capacitor clamp 107 to an input the discriminator amplifier 91. As shown in FIG. 4, the amplifier includes as the basic element a Texas Instruments Type SN72710L differential comparator. One input of the comparator is connected through a potentiometer 109 to a source of voltage. The video signal from the camera is applied to the second input of the differential comparator. The comparator compares the two voltages applied to its inputs and produces a binary-type output signal. This output signal has a first value of approximately 3.5 volts when the video signal exceeds the bias voltage applied to the comparator through potentiometer 109, and has a second value of approximately 0 volts when the video signal is less than the voltage derived through potentiometer 109. The duration of each binary signal corresponds to the width of the feature which causes it to be produced.

Figure 5:
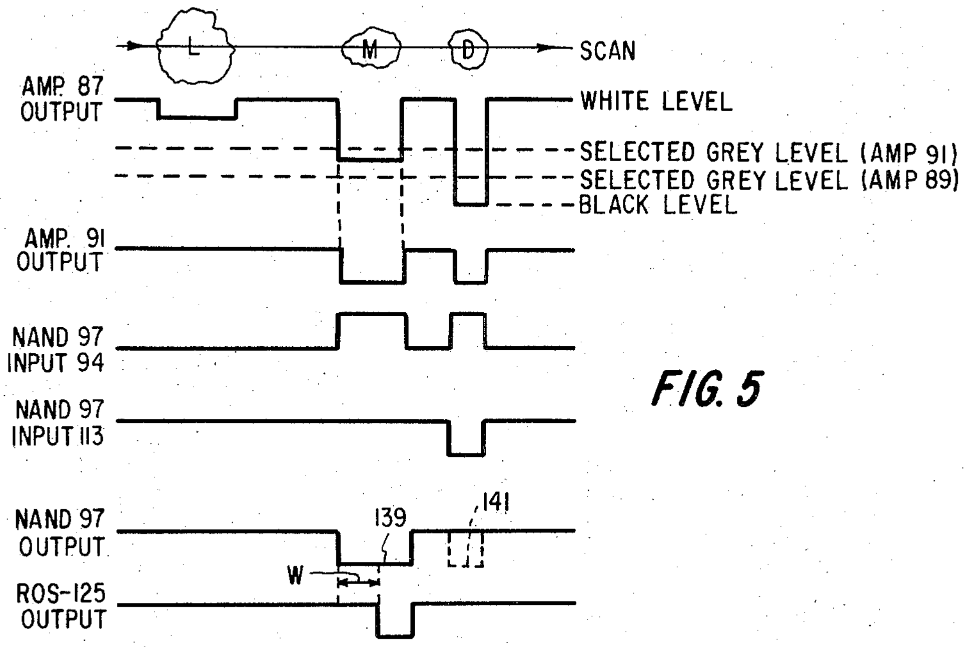
FIG. 5 is a waveform diagram showing various waveforms occuring within the circuit of FIG. 1.

In some instances it is desirable to count or display only those features of the specimen which are darker than some selected shade of grey. The amplifier 91 accomplishes this purpose. The potentiometer 109 is manually adjustable from the control panel of the specimen analyzer. Thus an operator may adjust the potentiometer and select the voltage applied to the first input of the differential comparator. FIG. 5 illustrates the condition where potentiometer 109 has been set to a selected grey level which is darker than the light grey feature L but lighter than the medium grey or dark grey features M and D. The level select amplifier 91 ignores the light grey feature L and its output remains at a high level until the scan of the camera encounters the leading edge of the medium grey feature M. At this time the output of the level select amplifier drops to a low value and remains at this value until the trailing edge of the feature is encountered. The output of the level select amplifier then returns to a high level and remains until the leading edge of the dark feature D is encountered. During the time the feature D is being scanned the output of the level select amplifier 91 remains at a low level and returns to a high level when the scan of the camera reaches the trailing edge of the feature. It is evident from a comparison of the waveforms that the 91 amplifier has discriminated between features on the basis of grey level and produced output signals only for those features darker than the selected grey level.

The output of amplifier 91 is connected by way of a lead 92 to the common terminal of the switch 93*a*. For purposes of the present description it will be assumed that the switch 93 is in its upper position so that the lead 92 is connected through the switch to the inverter 95. Inverter 95 serves the purpose of adjusting the voltage levels at the output of amplifier 91 to the optimum levels for operating the logic circuit to which these signals are subsequently applied. As stated before, the binary output signals from amplifier 91 are either at +3.5 v. or 0 V. The inverter 95, raises the +3.5 volt signals to the logical one level of 5.4 volts. The output of inverter 95 is connected by way of switch contacts 93*b*, and a lead 94 to one input of NAND gate 97. Thus, inverter 95 applies a positive pulse to one input of NAND 97 each time the camera scans across a feature that is darker than the grey level selected by the setting of potentiometer 109 in amplifier 91. The length of the pulse corresponds to the width of the feature.

As subsequently explained, the second input lead 113 to NAND 97 is always positive when the device is operating to detect features that are darker than a selected grey level. Thus, each positive input signal on the first input lead 94 causes NAND 97 to produce a negative output signal each time the camera scans a feature darker than the selected grey level.

In some cases it may be desired to detect only those features which are lighter than a preselected grey level. As in the previous case, the grey level is selected by setting the potentiometer 109 in amplifier 91. However, switch contacts 93*a* and 93*b* are set to isolate inverter 95 so that the output of amplifier 91 is directly applied over a lead 111 to one input of NAND 97. Thus, amplifier 91 applies a positive pulse to NAND 97 each time the camera scans a feature that is lighter than the selected grey level. Since the lead 113 is positive during the "lighter than" test, a negative pulse appears at the output of NAND 97 each time the camera scans a feature lighter than the selected grey level. In this mode of operation the NAND gate 97 not only performs the logic function but also converts the output of amplifier 91 to the proper voltage levels.

The output of amplifier 87 is applied by way of a diode-capacitor clamp 115 to the discriminator amplifier 89, and the output of amplifier 89 is connected by way of lead 113 to the second input of NAND 97.

Amplifier 87 is substantially identical to amplifier 91 described above and shown in FIG. 4. It also includes a grey level selection potentiometer 109, and produces a negative output signal any time the grey level represented by the input signal is darker than the grey level represented by the setting of the potentiometer.

The potentiometer 109 of amplifier 87 may be set to a "-black" setting such that no video signal applied to the amplifier input represents a shade of grey darker than the black setting of the potentiometer. When the potentiometer is so set, the amplifier output remains at a constant positive voltage. This voltage is applied over lead 113 to condition one input of NAND 97. This enables amplifier 91 and inverter 95 to perform either the "darker than" or the "lighter than" test, described above, depending upon whether inverter 95 is switched in or switched out of the circuit.

In many instances it is necessary to discriminate a single shade or a narrow range of grey intermediate the total grey scale. That is, it may be desirable to detect only those features which are not only darker than a selected level but are at the same time lighter than a second selected level. This function is performed by the amplifiers 89 and 91 in combination with NAND 97.

The potentiometer 109 of amplifier 91 is set so that the amplifier produces a negative output signal for each feature darker than the light-side limit of the range of greys being detected. Referring to FIG. 5, it is assumed that the amplifier 91 is set to detect features which are at least as dark as the features M and D. The amplifier 91 produces two output signals, and, after inversion by inverter 95, they are applied as positive pulses to input 94 of NAND 97.

The potentiometer 109 in amplifier 89 is set so that the amplifier produces a negative output signal for each feature darker than the dark-side limit of the range of greys being detected. In FIG. 5, it is assumed that amplifier 89 is set to detect features which are darker than feature M. Therefore, amplifier 89 produces only a single negative output pulse corresponding to the interval of time the feature D is scanned. The negative signal from amplifier 89 is applied over lead 113 to block NAND gate 97 and cause it to have a positive output during the interval that feature D is being intercepted by the scan of the video camera. Thus, only the feature M is detected as being darker than the level selected by the setting of amplifier 91, but lighter than the level selected by the setting of amplifier 89. The feature M is manifested by a negative intercept pulse 139 at the output of NAND 97, the width of this pulse being proportional to the width of the feature.

The intercept pulses produced by NAND 97 may be counted and/or displayed if desired. The output of NAND 97 is connected by a lead 98 to terminal B2 of a three-level, five-position switch S1. When switch S1 is set to position 2, lead 98 is connected through the switch, lead 203 and amplifier 205 to the input of scaler 43. If the cycle control is initiated by closing switch 37, the intercept pulses will be counted.

The intercept pulses may also be displayed on monitor 17 if the switch S1 is set to the proper position. A circuit extends from lead 203, amplifier 207, switch S2, and potentiometer 15, to the monitor. Depending upon the operator's adjustment of the potentiometer, the intercept pulses may be displayed alone, or superimposed upon an image of the specimen. Scaler 43 produces an output pulse on lead 204 for each pulse applied to the scaler. These output pulses may be displayed on the video monitor by setting S2 so that it connects with lead 204.

When working with uneven backgrounds for a specimen, it is possible for the background to be sensed and counted as features. This is particularly true when analyzing electron microscope photographs. To compensate for widely varying backgrounds, the amplifier 91 has a background compensation circuit. As shown in FIG. 4, this circuit includes a resistor 117 a capacitor 119, and a switch 121, connected in series. The video input signal to amplifier 91 is integrated by the resistance-capacitance of the compensating circuit to produce an average of the signal level over a scanned distance equivalent to the time constant of the series circuit. The compensation circuit is connected to the reference voltage of the amplifier at point 123 so that the background compensation voltage is summed with the reference voltage. As long as switch 121 is closed, the potentiometer may be used to select a reference level that is background compensated. The resistor 119 is made variable and controllable from the operator's control panel so that an operator may select the desired degree of compensation. Switch 121 permits the operator to cut out the background compensation circuit entirely. The background compensation circuit is employed only in amplifier 91 and is not required in amplifier 89.

Width Discrimination.

The width discrimination means comprises a retriggerable one-shot multivibrator (ROS) 125, an inverter 127, a one-shot multivibrator 129, a NAND gate 131, an inverter 133 and a selection switch 135. The output of NAND 97 in the grey level discriminator is connected to the input of ROS 125. The output of ROS 125 is connected through the inverter 127 to one terminal of switch 135. The output of inverter 127 is connected to the input of one-shot 129 and the output of the one-shot is connected to one input of NAND 131. The output of ROS 125 is connected to the second input of NAND 131. The output of NAND 131 is connected through the inverter 133 to a second terminal of switch 135.

The width discriminator circuit receives input pulses only from the NAND gate 97 at the output of the grey level discriminator circuit. As previously explained, each of these pulses has a width corresponding to the width of the feature which produced it. The width discriminator circuit tests each of these pulses and produces an output pulse only when the width of the feature being scanned meets a preselected test. The width discriminator can perform either of two tests. First, it can test each input pulse and produce an output pulse only if the input pulse represents a feature wider than a predetermined width. To perform this test, the switch 135 is connected to lead 128.

Secondly, the width discriminator can test each input pulse and produce an output pulse only if the feature is wider than a first width but narrower than a second width. Switch 135 is connected to the lead 134 when performing this test.

Figure 6:
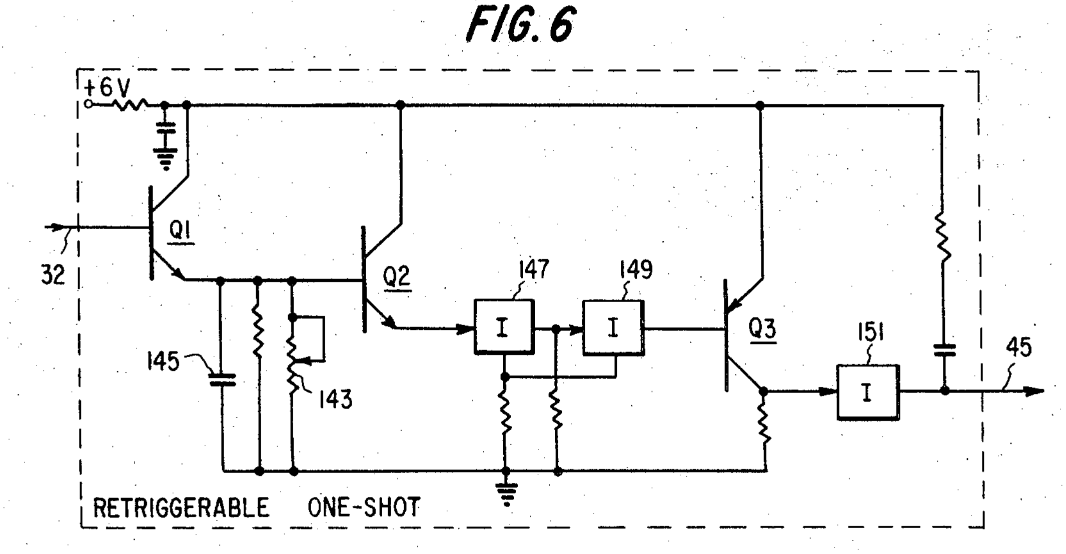
FIG. 6 is a schematic diagram of a retriggerable one-shot multivibrator.

A basic element of the width discriminator circuit is the retriggerable one-shot multivibrator 125. The retriggerable one-shot is a commercially available integrated circuit of conventional design and for purposes of the present description the circuit is shown in FIG. 6. The retriggerable one-shot functions as a conventional one-shot in that it receives an input signal and then, after a predetermined delay, produces an output signal. However, the retriggerable one-shot differs from the conventional one-shot in that the delay period of the retriggerable one-shot is immediately restarted each time the one-shot receives a new input signal. This feature is used for the purpose of discriminating between features on the basis of the width of the features. Generally speaking, for input signals of a duration less than the delay interval of the retriggerable one-shot produces no output signals. For input signals of duration greater than the delay interval of the one-shot the output signal is the residue obtained by blanking out a leading edge portion of the input signal equal to the delay interval.

The operation of retriggerable one-shot multivibrator 125 as a feature width discriminator may be best understood by considering FIG. 6 in connection with the waveform diagrams of FIG. 5. Assume that the grey level select circuit has been set for a grey level test such that both of the features M and D meet the test but the feature L does not. Under these conditions, NAND 97 produces the two negative pulses indicated at 139 and 141 in FIG. 5. The output of NAND 97 is applied to the input of the retriggerable one-shot 125. The retriggerable one-shot includes a potentiometer 143 which is manually controllable from the control panel of the specimen analyzer. As will be evident from the following discussion this potentiometer may be selectively set to discriminate between features on the basis of the widths of the features. Assume that the potentiometer 143 is set to detect features having a width greater than W where W is less than the width of the particle M but greater than the particle D. Up until the time the video camera encounters the leading edge of the feature M the input to the retriggerable one-shot is at a high level thus causing transistor Q1 to conduct. Current from a 6-volt source flows through Q1 to charge a capacitor 145 and apply a positive signal to a transistor Q2. Transistor Q2 conducts and produces a high level signal at its emitter. This signal is inverted by inverters 147 and 149 and applied to the base of a transistor Q3, thus holding Q3 in the off condition. The low level signal at the emitter of Q3 is inverted by an inverter 151 to produce a high level output signal from the retriggerable one-shot.

When the scan of the video camera intercepts the leading edge of the particle M the input signal to the retriggerable one-shot drops from a high level to a low level. This cuts off transistor Q1. However, because of the charge on capacitor 145, there is no immediate change in the output from the retriggerable one-shot and the output remains at a high level. When Q1 is cut off the capacitor 145 begins to discharge and the rate of discharge is governed by the setting of the width discriminator potentiometer 143. After an interval of time W as determined by the setting of potentiometer 143 the capacitor 145 discharges to a value sufficiently low to cut off transistor Q2. This causes the output of the retriggerable one-shot to drop to a low level.

The output from the retriggerable one-shot remains at a low level until the scan of the camera reaches the trailing edge of the feature M. At this time the input signal to the retriggerable one-shot again rises to the high level and transistor Q1 is again turned on. The capacitor 145 is immediately recharged and the transistor Q2 is turned on, thus causing the output of the retriggerable one-shot to return to the high level. As shown by the waveform of FIG. 5, the net effect of the retriggerable one-shot is to delay the input signal applied thereto for an interval W and shorten the leading edge of the input signal by an interval W.

In FIG. 5 it is assumed that the feature D has a width less than W. The low level signal 141 from NAND 97 representing feature D is applied to the retriggerable one-shot and the delay interval is initiated. However, because the feature has a width less than the preselected delay interval as determined by potentiometer 143, the input signal to the retriggerable one-shot returns to a high level before the delay interval is terminated and thus prevents a low level output signal from being produced.

As the potentiometer 143 is adjusted to produce a minimum resistance in the discharge path for capacitor 145, the delay interval W becomes less and the retriggerable one-shot will produce output signals representing smaller features.

The fast response of the retriggerable one-shot enables the present device to accurately recognize two particles that are extremely close together. If the video camera is capable of recognizing a separation between features, then this recognition will not be lost by the pulse width discriminator. Thus, two closely spaced features will be counted as separate features and not as a single feature as happens with some prior art devices. It is evident from the preceding discussion that the retriggerable one-shot 125 has an extremely fast response time. By varying the potentiometer 143 delay times as great as 10 microseconds may be obtained while still retaining a one-fourth microsecond resolution. For such operation it is obvious that the capacitor 145 must be quite small. In fact, in some instances the capacitor 145 may be nothing more than the inherent capacitance of the circuit.

It should be noted that the last waveform of FIG. 5 represents the result of discriminating between the features L, M and D on the bases of both grey level and width. The retriggerable one-shot produces an output signal for feature M because only this feature meets the selected grey level test and is wider than the selected width. Had the feature L met the preselected grey level test then the output waveform for the retriggerable one-shot would have included a low level signal representing feature L, this signal being longer than the signal representing the feature M.

In accordance with the present invention is is also possible to perform a width test and produce an output signal for any feature wider than a first selected width but more narrow than a second selected width. For ease of explanation this will be referred to as the delta test. The switch 135 is set to connect with the lead 134 when performing the delta test.

In performing the delta test, ROS 125 functions in the same manner as it does in the width test previously described. That is, it determines the minimum width or the lowest range which will pass the test. The one-shot multivibrator 129 is used to control the maximum width of the delta test. The outputs of ROS 125 and one-shot 129 are fed to the inputs of NAND 131 so that the NAND gate produce an output pulse for each feature wider than the minimum width as determined by the setting of the ROS, but narrower than a width as determined by a manual control in the one-shot 129.

Figure 7:
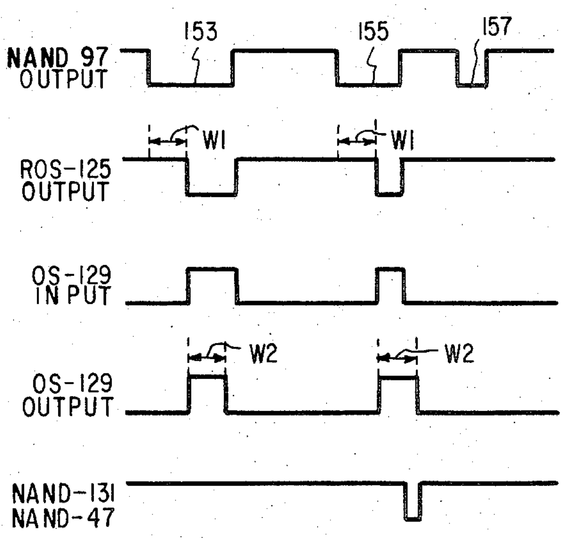
FIG. 7 is a waveform diagram illustrating the operation of the width discriminator; and, FIGS. 8A—8D are further waveform diagrams illustrating the operation of feature discriminator.

FIG. 7 is a waveform diagram illustrating the operation of the device when performing a delta test. In FIG. 7, it is assumed that three features of different widths have all passed the grey level test so that NAND 97 produces three negative pulses 153, 155 and 157 each corresponding in width to the width of a wide, a medium, and a narrow feature respectively. Furthermore, it is assumed that the potentiometer 143 (FIG. 6) of ROS 125 is set to produce output pulses only for features wider than $W_1$, $W_1$ being wider than the width of pulse 157. Thus ROS 125 produces only two negative output pulses, one for each of the pulses 153 and 155.

The output of ROS 125 is inverted at inverter 127 and applied to the one-shot multivibrator 129. The one-shot may be of the type shown in FIG. 2. It responds to the leading edge of a positive pulse to immediately produce a positive output pulse. The duration $W_2$ of the output pulse is determined by the setting of the potentiometer 83. The potentiometer 83 is manually adjusted by the operator of the analyzer so that the pulse width $W_2$ plus the delay $W_1$ of ROS 125 equals the maximum width to be detected during a delta test.

In the assumed example $W_2+W_1$ is greater than the width of pulse 155 but less than the width of pulse 153. Therefore, the delta test circuit produces only one output pulse corresponding to the original pulse 155. As shown in FIG. 7, the negative output of the one-shot 129 is applied to one input NAND 131 from a time prior to pulse 153 until the time ROS 125 responds to pulse 153. At this time, the output of the one-shot goes positive. However, at the same time, the negative output pulse from ROS 125 is applied to the second input of NAND 131 so the output of the NAND circuit remains at a high level.

Under the assumed conditions the duration of the output pulse from the one-shot is such that it terminates before the negative output of ROS 125 terminates. Therefore, when the output of ROS 125 goes positive the output of NAND 131 remains positive because of the negative input from the one shot. It is obvious therefore that the pulse 153 which is wider than $W_1+W_2$ has failed to produce a change in the output of NAND 131.

Continuing with the description of FIG. 7, the negative output of the one-shot keeps the output of NAND 131 at a high level until ROS 125 produces a negative output pulse in response to the pulse 155. The output of the one-shot goes positive but the output of NAND 131 remains positive because it now receives the negative output of ROS 125. The output of the one-shot is still positive when the negative output of ROS 125 terminates. With both inputs positive, NAND 131 produces a negative pulse indicating that the feature represented by pulse 155 meets the delta test. After a short interval the output of the one-shot again goes negative thus terminating the negative output pulse from NAND 131.

The negative output pulse from NAND 131 is inverted by inverter 133 and applied through switch 135 to one input of NAND 47. Assuming that the feature which produced pulse 155 is within the unmasked area of the specimen, the second input 59 to NAND 47 is also positive, as previously explained. With both inputs positive, NAND 47 produces a negative output pulse.

From the foregoing description it is obvious that NAND 47 produces an output pulse each time the scan of the camera intercepts a feature that meets both the grey level and width tests if the feature is within the unmasked area of the specimen.

In order to count these intercept pulses, the output of NAND 47 is connected by way of leads 159 and 161 to position 3, level B of the three-level five-position switch S1.

The switch S1 has five operative positions. Position one is an inoperative position and corresponds to the Off position. When the switch is set to position three, the intercept output signals from NAND 47 are applied through S1–B3 to a lead 203. This lead connects with the input of an inverter 205, the output of this inverter being connected to the count pulse input of the scaler 43. As previously described, the scaler requires an enabling input signal on lead 41 and this signal occurs for the duration of the camera field following the closing of the switch 37. The scaler, if conditioned to count, will respond to output signals from NAND 47 and provide an indication of the number of times during one field that the camera scan intercepts features in the unmasked area that meet both the grey level test and the width test.

The intercept pulses applied to the scaler may also be continuously displayed on the monitor 17 by setting a switch S2 so that it connects with the output of inverter 207. A circuit is then formed from NAND 47 switch contact S2–B3 lead 203 inverter 207, switch contacts S2, and potentiometer 15, to the display monitor.

One of the primary functions of the specimen analyzer is to count the number of features which meet both a preselected grey level test and a preselected width test. In order to accomplish this purpose the scaler should receive only one pulse for each feature meeting the tests regardless of the number of times the video camera scans across the feature. The video camera scans the specimen in a sequence of horizontal scans each slightly vertically displaced from the previous scan as is conventional in television practice. A single feature may be intercepted several times, the exact number of times being dependent upon the length of the feature in the direction transverse to the scanning operation. Each intercept of the feature results in an output pulse from NAND gate 47 when the feature is within the unmasked area and meets both the grey level width tests. One purpose of the circuits connected to the output of NAND 47 is to compare the output of NAND gate 47 during each horizontal scan with the delayed output of the NAND gate for the preceeding scan, and produce an output signal only when there is a delayed signal indicating an intercept but no real time signal indicating an intercept. Stated differently, the circuit is responsive to the output of NAND 47, to produce a single output pulse for each feature to be counted, and this pulse occurs on the line scan interval after the last intercept of the feature.

A mere delay line and comparison circuit would be sufficient for resolving the feature count if all particles had straight edges. In this case, each intercept of the feature would occur exactly one line scan interval after the preceding intercept. However, it is most unusual to find features having straight edges. More generally, they are quite irregular in shape or at least have curved edges so that the scan of the video camera during the line scan does not intercept the feature exactly one line scan interval later during the next scan. Another purpose of the circuits connected to the output of NAND 47 is to overcome this problem and thus permit a single count pulse to be developed for each feature even though it might be quite irregular.

The output of NAND 47 is applied by way of lead 165 to one input of a NAND gate 167. The output of NAND 47 is also connected by way of a lead 159 to the common terminal of the A level of a switch S1. Contact A4 of switch S1 is connected by way of a lead 171 to a delay line 173. This delay line may, for example, be a glass ultrasonic delay line such as the model CE-5.04 manufactured by the Corning Glass Works. The delay line provides a nominal delay of one line scan interval. The output of delay line 73 is connected to a variable delay 174 which permits varying the total delay for an interval greater than one line scan interval. The output of the delay line is connected through a noninverting amplifier 175 to a second input of NAND gate 167. Amplifier 175 may be similar to the circuit shown in FIG. 4.

The output of NAND gate 167 is connected through an inverter 180 and a lead 181 to one input of a NAND gate 183. The output of NAND 47 is connected through an inverter 185 to the input of a retriggerable one-shot 187 and the output from the retriggerable one-shot is connected through an inverter 189 to a second input of the NAND gate 183. The output of NAND gate 83 is connected to the terminal B4 of the switch S1. When the switch S1 is set to position four it connects the output of inverter 91 with the input of the scaler 43 through an inverter 205.

FIGS. 8A through 8D illustrate four situations that may arise in resolving the intercept pulses produced at the output of NAND gate 47 so as to produce a single count pulse for each feature rather than for each intercept of the feature. To simplify the following discussion, it is assumed that the changes in signal level at NAND 47 occur exactly at the instant the camera scan intercepts the feature. This would correspond for the condition where the control of the retriggerable one-shot 125 is set to detect any feature greater than zero width. In cases where features greater than a width W are being detected, the waveform for NAND 47 is shortened and delayed at its leading edge.

Figure 8A:
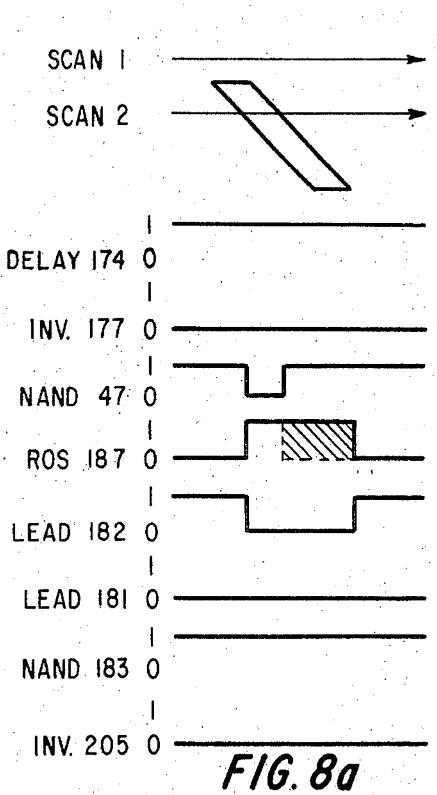

FIG. 8A illustrates the situation where feature is intercepted during a present scan 2 but on a preceding scan 1 the feature was not intercepted. Under these circumstances a high level signal entered into delay line 173 from the output of NAND gate 47 during scan 1 emerges from delay 174 during scan 2. The emerging signal is inverted by inverter 177 and applied to NAND gate 167. Therefore, during scan 2 the low level output of inverter 177 passes through NAND gate 167 and inverter 180 and appears as a logical zero on lead 181. The logical zero signal appears at the output of NAND gate 183 as a logical one on the lead 195. The logical one level on the lead 195 is applied through switch contacts S1–B4 to inverter 205. Inverter 205 produce a low level output signal which will not be counted by scaler 43.

Figure 8B:
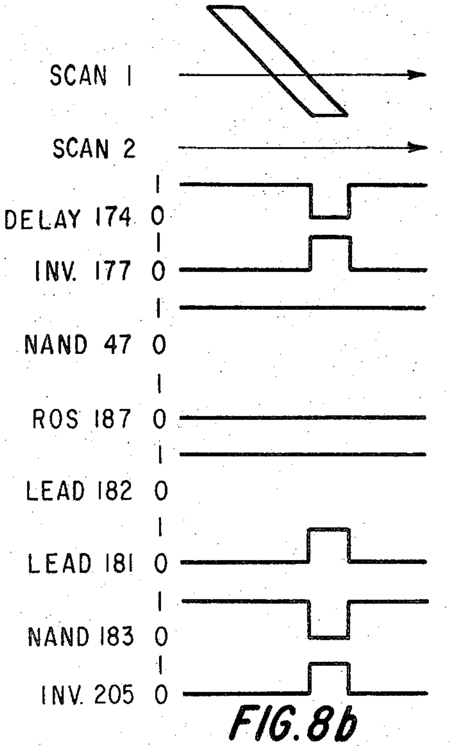

FIG. 8B illustrates a set of conditions where a present scan 2 does not intercept a feature but one preceding scan 1 does intercept the feature. In this case a logical one level should be produced on the lead 45 to be applied as a count pulse to the scaler. During the interval of scan one that the feature is being intercepted the negative output signal from NAND gate 47 is stored in delay line 173. During scan two the delayed signal emerges from delay line 174 and is inverted at inverter 177 to produce a logical one at one input of NAND 167. As shown in FIG. 8B, the output of inverter 177 is shifted to the right with respect to the cross section of the feature intercepted during scan 1. This shift indicates a delay of more than one line scan interval and is set by the manually adjustable delay trimmer 174. The output of inverter 177 is applied to one input of NAND gate 167. Since the feature is not intercepted during scan 2 the output of NAND gate 47 is at the logical one level. This logical one signal is applied over lead 165 to the second input of NAND gate 167. With both inputs positive NAND gate 167 produces a logical zero output that is inverted by inverter 180 and applied over lead 181 as a logical one signal to the NAND gate 183.

The logical one signal appearing at the output of NAND 47 is inverted at 185 and applied as a logical zero signal to the input of retriggerable one-shot 187. The retriggerable one-shot does not invert the signal so the logical zero output from the retriggerable one-shot is inverted by inverter 189 and applied as a logical one signal over the lead 182 to the NAND gate 183. Therefore, both inputs to NAND gate 183 are at the logical one level as long as there is a logical one output from inverter 177. The resulting logical zero signal appearing at the output of NAND gate 183 is applied through S1–B4 to inverter 205 where it is inverted to become a logical one feature count pulse on the lead 45.

Figure 8C:
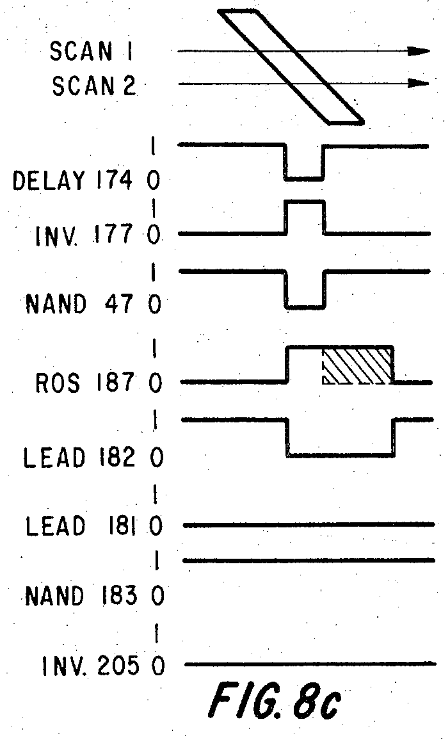
Figure 8D:
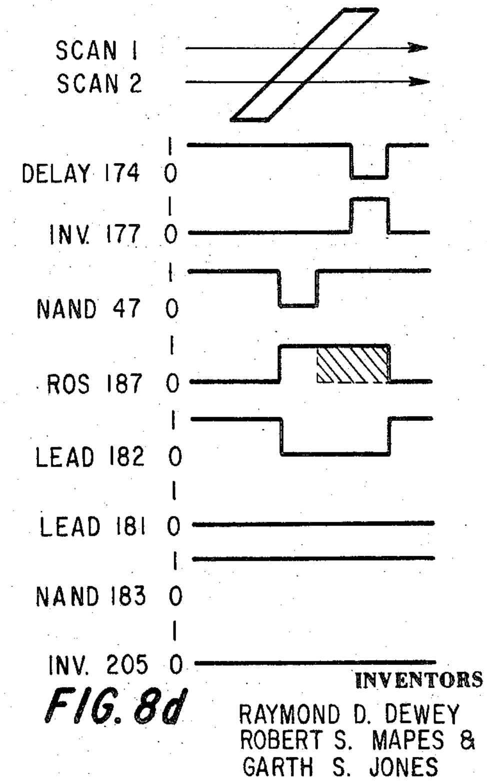

FIGS. 8C and 8D illustrate the situations that may occur when two successive scans intercept a feature but the intercepts do not occur exactly one scan interval apart. FIG. 8C illustrates the case where the feature is intercepted earlier during scan 1 than it is during scan 2. The logical zero output signal from NAND gate 47 produced during scan 1 is stored in the delay line 173 and emerges from delay 174 slightly more than one line scan interval later. The logical zero signal is inverted by inverter 177 and applied to one input of NAND gate 167. The logical zero output signal occurring at the output of NAND gate 47 during scan 2 is applied to the second input of NAND gate 167. As shown by FIG. 8C the output of inverter 177 would rise to the logical one level before the output of inverter 63 dropped to the logical zero level if the delay line did not delay the signal applied to it by more than one full line scan interval. However, with the delay introduced by the adjustable delay 174, the output of the inverter 177 remains at the logical zero level at least until the output of NAND 47 drops to the logical zero level. At the end of the logical zero signal the output of NAND 47 rises to the logical one level, but at this time the output of the inverter 177 is shifting to the logical zero level so NAND gate 167 remains blocked. The high level output from NAND gate is inverted by inverter 180 and applied as a logical zero signal over the lead 181 to NAND gate 183. This blocks NAND gate 183. However, NAND gate 183 could not produce a count pulse even if the pulse at NAND 47 terminated before the pulse at inverter 177. The logical zero output from NAND 47 is inverted 185, the trailing edge delayed at 187, and the resulting signal inverted to 189 to appear on lead 182. The trailing edge delay introduced by retriggerable one-shot 187 enables the lead 182 to remain at the logical zero level until some time after a logical one level on lead 181 terminates. Therefore, NAND gate 183 would maintain a logical one output that would be inverted at 205 to appear as a logical zero (no count) on the lead 45.

FIG. 8D illustrates the operation of the circuit where the feature is intercepted at a particular point during scan 1 and is intercepted at a second point in scan 2 which is less than one whole line scan interval later. A detailed explanation of the circuit operation is deemed necessary in view of the illustrations given above. In general, the delay 174 and delay line 173 delay the output of NAND 47 and the resulting signal is compared with the real time output from NAND 47. Any residue signal resulting from this comparison is applied to the NAND gate 183. However, this residue pulse, if any, is blocked at NAND gate 183 because the trailing edge of the output signal of NAND 47 is delayed by retriggerable one-shot 87 and applied to lead 182 to block the NAND gate.

From the preceding description it is seen that the feature discriminator permits the generation of only one pulse for each feature even though the features are irregular and may be intercepted by the camera scan at intervals that are not exactly one line scan interval apart. Furthermore, the degree of compensation for such irregularity is variable at the discretion of the operator. The compensation for leading edge irregularity is controlled by adjusting the delay of element 174, and the compensation for trailing edge irregularity is controlled by adjusting a potentiometer in the retriggerable one-shot 187 so as to vary the delay it produces.

Although FIGS. 8A through 8D illustrate the development of a single count pulse for a single solid feature, the invention is not so limited. By waveforms similar to those of FIGS. 8A through 8D it can be shown that the present invention produces a single count pulse for features having lighter interior portions such as, for example, O-shaped features. The only time that the present invention will produce an inaccurate count is when it analyzes a feature having a reentrant outline with more than one downwardly extending appendage. In this case a count pulse is developed for each of the appendages. For example, an inverted Y feature would be counted as two features.

The feature count pulses appearing on lead 195 may be applied to scaler 43 and the video monitor 17. The circuit extends from lead 195 through S1–B4, lead 203 and inverter 205 to the input of the scaler. If the scaler is conditioned by a control signal on lead 41 it will accept the pulses. For display purposes the count pulses on lead 203 are applied through inverter 207 to switch S2. If S2 is set to connect with the output of inverter 207 then the count pulses pass through mixing potentiometer 15 to the monitor. The potentiometer 15 permits the operator to select the desired mix of the video signal on lead 14 and the count pulses from switch 2. This permits either the count pulses or the image to be emphasized at the discretion of the operator so as to display the count pulses alone, the specimen image alone, or the count pulses superimposed on the specimen image.

When functioning properly the scaler counts the pulses received over lead 45 and produces an output pulse on lead 204 for each pulse that it counts. Lead 204 connects with switch S2 so that the output pulses from the scaler may be applied through the switch to the monitor. Thus, one position of the switch 2 applies to the monitor one pulse for each pulse applied to the scaler whereas the other position of switch 2 applies to the monitor one pulse for each pulse counted by the scaler. Therefore, by selectively positioning switch S2 the operator may make a visual check to see that all pulses that should be counted are actually counted by the scaler.

Area Analysis.

The feature analyzer may also be utilized to determine the percentage of the unmasked area of specimen covered by features meeting the selected grey level and width tests feature. The output of NAND gate 47 is utilized to control pulses generated by an oscillator and these pulses are fed to the scaler 43. In order to accomplish this, the terminal A5 of switch S1 is connected through an inverter 196 to one input of a NAND gate 197. An oscillator 199 has its output connected to a second input of the NAND gate 197. The output of NAND gate 197 is connected through terminal B5 of switch S1 to lead 203, inverter 205, and the scaler. The oscillator is connected through terminal C5 of switch S1 to a 5.4 volt source. This source controls the oscillator so that it produces output pulses only when switch 1 is set to position 5.

Since the mask area for any particular operation may vary, it is necessary to know the total area falling within the unmasked region before a determination can be made as to the percentage of this area that is covered by features meeting the grey level and width tests. The calibration of area is accomplished by means of the switch 135. The switch 135 is set to its center position thereby making NAND 47 function as an inverter. Switch 2 is set to position 5. The video camera continuously produces horizontal and vertical sync pulses which control the masking one-shot multivibrators so that there is a positive signal on lead 59 during each horizontal scan, and for an interval of time as determined by the controls of the masking one-shots. Therefore, during each horizontal scan of the unmasked area, the output of NAND gate 47 is at a low level. This output is applied through switch S1–A5 and inverter 196 to one input of NAND gate 197. The continuously running oscillator 199 produces positive pulses to condition the other input of the NAND gate and it produces low level output signals that are applied through contact S1–B5, lead 203, and amplifier 205 to the scaler 43. A cycle is initiated by closing the cycle control switch 37 to thereby condition the scaler for one cycle. During this cycle the scaler accumulates a count which represents the total area that is unmasked.

After the total area of the unmasked region is determined the next step is to determine the area within the unmasked area that is covered by features meeting both the grey level test and the width test. The switch 135 is set to connect either lead 128 or 134 to the input of NAND 47, depending upon the type of width test the features must meet. Cycle control switch start button 37 is again closed to initiate the one-shot 39 and condition the scaler for one cycle of counting. The grey level test circuit and the width test circuit function in a normal manner and as a result, a sequence of pulses is produced on lead at the first input of NAND gate 47. Each of these pulses represents a feature that meets both the grey level and width tests.

Furthermore, each of the signals at the first input of NAND 47 has a duration which is dependent upon the width of the feature detected. If the feature detected is in the unmasked region, the NAND gate 47 produces an output signal that is applied through switch contacts S1–A5 and inverter 196 to condition NAND gate 197. As in the calibration step described above, the oscillator applies pulses to the second input of NAND gate 197 and the resulting output pulses from the NAND gate are applied through inverter switch contact S1–B5 and inverter 205, to the scaler. Therefore, on each horizontal scan one or more pulses are fed to the scaler, the exact number of pulses being fed being dependent upon the number of feature pulses applied to NAND 47 and the duration of these pulses. After a complete field of scans, the scaler contains a count which is a percentage of the calibration count obtained during the calibration step. This percentage represents the percentage of the total area of the unmasked region which is covered by features meeting the grey level test and the width test.

From the above description it is seen that the present invention provides a highly versatile specimen analyzer that is more accurate than the analyzers heretofore known. It permits electronic masking without requiring the compensation circuits normally required when such masking is used. The device is capable of counting features of very irregular shape and is also capable of counting features which are very closely spaced.

Although a specific embodiment of the invention has been described with great particularity, it will be understood that the invention is not limited to the specific embodiment shown. Various modifications falling within the spirit and scope of the invention will be obvious to those skilled in the art.

The embodiments of the invention in which an exclusive property or privilege is claimed are defined as follows:

We claim:

1. In a specimen analyzer for analyzing a specimen containing features, the combination comprising:

grey level discriminator means responsive to an analog signal representing features of said specimen for producing binary-type output signals having a first value at least during intervals that said analog signal exceeds a first preselected level and a second value during intervals that said analog signal does not exceed said first preselected level; said binary type output signals each having a duration corresponding to the width of the feature which caused it to be produced and, width discriminator means responsive to said binary type output signals for producing an intercept signal for each feature that is wider than a first preselected width $W_1$ but not as wide as a second preselected width $W_1+W_2$.

2. The combination as claimed in claim 1 wherein said width discriminator means comprises:

a retriggerable one-shot multivibrator;

a one-shot multivibrator;

coincidence detection means responsive to said one-shot multivibrator or for producing said intercept signals; and, means for applying the output of said retriggerable one-shot multivibrator to said one-shot multivibrator and said coincidence detection means.

3. The combination as claimed in claim 1 wherein said grey level discriminator means comprises a first discriminator means responsive to said analog signal for producing first binary-type signals, said grey level discriminator means further comprising:

a second discriminator means responsive to said analog signal for producing further binary-type signals only during intervals that said analog signal exceeds a second preselected level;

and coincidence circuit means responsive to said first and second discriminator means for producing said binary-type output signals of said first value only during intervals when said analog signal exceeds said first preselected level but not said second preselected level.

4. The combination as claimed in claim 1 wherein said width discriminator means comprises:

first presettable means responsive to said binary-type output signals from said grey level discriminator for producing a first intercept signal for each feature wider than said first preselected width $W_1$;

second presettable means responsive to each said first intercept signal for producing a pulse having a preselected width $W_2$; and, coincidence circuit means responsive to said first and said second presettable means for producing a second intercept signal for each feature wider than said first preselected width but not as wide as said second preselected width.

5. The combination as claimed in claim 4 and further comprising:

scanning means for scanning said specimen and producing said analog signal;

feature discriminator means for producing one count pulse for each feature scanned by said scanning means; and, switch means for selectively applying either said first and said second intercept signals to said feature discriminator means.

6. In a specimen analyzer for analyzing a specimen containing features, the combination comprising:

grey level discriminator means responsive to an analog signal representing features of said specimen for producing binary-type output signals having a first value during intervals that said analog signal exceeds a first preselected level but does not exceed a second preselected level, and a second value during intervals that said analog signal does not exceed said first preselected level or does exceed said second preselected level;

said binary-type output signals each having a duration corresponding to the width of the feature which causes it to be produced; and, width discriminator means responsive to said binary-type output signals for producing an intercept signal for each of said features which is wider than a preselected width.

7. The combination as claimed in claim 6 wherein said grey level discriminator means comprises a first discriminator means responsive to said analog signal for producing first binary-type signals, said grey level discriminator means further comprising:

a second discriminator means responsive to said analog signal for producing further binary-type signals during intervals that said analog signal exceeds said second preselected level;

and coincidence circuit means responsive to said first and second discriminator means for producing said binary-type output signals of said first value only during intervals when said analog signal exceeds said first preselected level but not said second preselected level.

8. A specimen analyzer as claimed in claim 6 wherein said width discriminator means comprises means responsive to said binary-type output signals for producing intercept signals having a duration related to the width of the feature which caused it to be produced.

9. A specimen analyzer for analyzing a specimen containing features, said specimen analyzer comprising:

grey level discriminator means responsive to an analog signal representing features of said specimen for producing binary-type output signals having a first value during intervals that said analog signal exceeds a first preselected level but does not exceed a second preselected level, said binary-type output signals each having a duration corresponding to the width of the feature which caused it to be produced; and, width discriminator means responsive to said binary-type output signals for producing an intercept signal in response to each binary-type output signals that exceeds a first duration but does not exceed a second duration, whereby an intercept signal is produced for each feature only if said feature has characteristics falling between first and second preselected grey levels and first and second preselected widths.

10. A specimen analyzer as claimed in claim 9 wherein said width discriminator means comprises means responsive to said binary-type output signals for producing intercept signals having a duration related to the width of the feature which caused it to be produced.

11. A specimen analyzer as claimed in claim 9 and further comprising:

a scaler; and, means including manually controllable switch means for selectively applying said intercept signals or said binary-type output signals to said scaler.

12. A specimen analyzer as claimed in claim 9 and further comprising:

scanning means for scanning said specimen during a plurality of line scan intervals whereby said features may be intercepted more than one time by said scanning means; and, feature discriminator means responsive to said intercept signals for producing one count pulse for a feature even though it may be intercepted more than one time by said scanning means.

13. A specimen analyzer as claimed in claim 12 wherein said scanning means comprises a video camera, said specimen analyzer further comprising:

video display means responsive to said video camera and said count pulses for displaying each count pulse adjacent the feature which caused it to be produced.

14. A specimen analyzer as claimed in claim 9 and further comprising:

scanning means for scanning said specimen during a plurality of line scan intervals whereby said features may be intercepted more than one time by said scanning means;

an oscillator; and, gating means responsive to said intercept signals and said oscillator, whereby said gating means produces a number of output pulses related to the area of features in said specimen that have said characteristics.

15. A specimen analyzer as claimed in claim 14 and further comprising:

manually controllable variable electronic masking means for inhibiting intercept signals resulting from the scanning of features within the masked area of said specimen.

16. In a specimen analyzer for analyzing a specimen containing features, the combination comprising:

grey level discriminator means responsive to an analog signal representing features of said specimen for producing binary-type output signals having a first value at least during intervals that said analog signal exceeds a first preselected level and a second value during intervals that said analog signal does not exceed said first preselected level; said binary type output signals each having a duration corresponding to the width of the feature which caused it to be produced; and, width discriminator means responsive to said binary-type output signals for producing an intercept signal having a duration related to the width of the feature which caused it to be produced for each feature that is wider than a first preselected width $W_1$ but not as wide as a second preselected width $W_1+W_2$.